US012812733B2

(12) United States Patent
Gaillet et al.

(10) Patent No.: US 12,812,733 B2
(45) Date of Patent: Nov. 24, 2026

(54) METHOD FOR MANAGING A DATA COMMUNICATION DEVICE AND DEVICE FOR IMPLEMENTING THE METHOD

(71) Applicant: Orange, Issy-les-Moulineaux (FR)

(72) Inventors: Thierry Gaillet, Chatillon Cedex (FR); Sylvain Leroux, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 702 days.

(21) Appl. No.: 17/415,631

(22) PCT Filed: Dec. 9, 2019

(86) PCT No.: PCT/FR2019/052966
§ 371 (c)(1),
(2) Date: Jun. 17, 2021

(87) PCT Pub. No.: WO2020/128217
PCT Pub. Date: Jun. 25, 2020

(65) Prior Publication Data

US 2022/0078885 A1 Mar. 10, 2022

(30) Foreign Application Priority Data

Dec. 19, 2018 (FR) ...................................... 1873363

(51) Int. Cl.
*H04W 84/18* (2009.01)
*H04W 4/02* (2018.01)
(Continued)

(52) U.S. Cl.
CPC ............. *H04W 84/18* (2013.01); *H04W 4/02* (2013.01); *H04W 4/06* (2013.01); *H04W 4/70* (2018.02);
(Continued)

(58) Field of Classification Search
CPC ......... H04W 84/18; H04W 4/02; H04W 4/06; H04W 4/70; H04W 52/0254; H04W 84/02
See application file for complete search history.

(56) References Cited

U.S. PATENT DOCUMENTS 8,493,943 B1 7/2013 Segall et al.
2010/0255781 A1* 10/2010 Wirola .................... G01S 19/34
455/67.11
(Continued)

FOREIGN PATENT DOCUMENTS

WO WO 2018/118182 A1 6/2018

OTHER PUBLICATIONS

International Search Report for International Application No. PCT/FR2019/052966 mailed on Apr. 2, 2020.
(Continued)

*Primary Examiner* — Jackie Zuniga Abad
(74) *Attorney, Agent, or Firm* — Knobbe, Martens, Olson & Bear, LLP

(57) ABSTRACT

A method is provided for managing a data communication node in a group comprising at least the node. The method includes, at the node: selecting an operating mode among a plurality of operating modes configured on the node and comprising a representative mode; and, when the node is operating in the representative mode, generating representative node data and transmitting the representative node data to a group management unit, wherein the group comprises a second node, and the representative node data at least relate to the second node.

19 Claims, 5 Drawing Sheets

(51) Int. Cl.
*H04W 4/06* (2009.01)
*H04W 4/70* (2018.01)
*H04W 52/02* (2009.01)
*H04W 84/02* (2009.01)

(52) U.S. Cl.
CPC ....... *H04W 52/0254* (2013.01); *H04W 84/02* (2013.01)

(56) References Cited

U.S. PATENT DOCUMENTS

| | | | | |
|---|---|---|---|---|
| 2015/0018025 | A1 | 1/2015 | Wu | |
| 2016/0366634 | A1* | 12/2016 | Khalife | H04W 8/005 |
| 2017/0372605 | A1* | 12/2017 | Khandelwal | G08G 1/096783 |
| 2018/0184360 | A1* | 6/2018 | Cavalcanti | H04W 40/24 |
| 2018/0255495 | A1* | 9/2018 | Dietrich | H04W 88/06 |
| 2019/0041508 | A1* | 2/2019 | R | G01S 13/765 |

OTHER PUBLICATIONS

Office Action for European Patent Application No. 19839643.4, dated Jan. 17, 2024 (and Application published as EP3900386).

* cited by examiner

METHOD FOR MANAGING A DATA COMMUNICATION DEVICE AND DEVICE FOR IMPLEMENTING THE METHOD

CROSS-REFERENCE TO RELATED APPLICATIONS

This application is filed under 35 U.S.C. § 371 as the U.S. National Phase of Application No. PCT/FR2019/052966 entitled "METHOD FOR MANAGING A DATA COMMUNICATION DEVICE AND DEVICE FOR IMPLEMENTING THE METHOD" and filed Dec. 9, 2019, and which claims priority to FR 1873363 filed Dec. 19, 2018, each of which is incorporated by reference in its entirety.

BACKGROUND

Technical Field

The present subject disclosure relates to a method for managing a data communication device, as well as to a device for implementing this method. It applies in particular to portable data communication devices used in the context of the Internet of Things.

Description of the Related Technology

The recent growth in Internet of Things technologies has led to considering different use cases in which connected objects are networked in order to monitor various attributes of these objects, for example their respective geolocations.

Tracking the geolocation of an object is typically done through a geolocation sensor associated with the object, configured to supply geolocation data to a remote server.

SUMMARY OF CERTAIN INVENTIVE ASPECTS

However, the use of sensors equipped with minimal power and transmission means designed to communicate over low-power wireless links requires designing strategies that allow geolocation tracking of connected objects while preserving the means used to obtain the geolocation data.

An object of the present subject disclosure is to at least partially remedy the above disadvantages.

According to a first aspect, a method is provided for managing a data communication node in a group comprising at least the node, the method comprising, at the node: selecting an operating mode among a plurality of operating modes configured on the node and comprising a representative mode; and, when the node is operating in the representative mode, generating representative node data and transmitting the representative node data to a group management unit, wherein the group comprises a second node, and the representative node data at least relate to the second node.

Thus, the use of the respective resources (in particular energy, bandwidth, addressing) associated with each communication node of a group for communicating with a group management unit can advantageously be reduced, which allows them to be safeguarded, and in addition allows reducing the wear on communication nodes of the group.

Indeed, by entrusting a limited number of nodes of the group operating in the representative mode with functions involving communications with a group management unit, for example such as functions sending data generated by the nodes of the group or based on data produced by the nodes of the group, inventorying the nodes of the group, as these are functions which can consume many more resources for the node or nodes implementing them than a communication between two nodes of the group, this reduces the use of available resources on each node while carrying out the desired functions for the group.

For example, the provided method provides an advantageous response to the redundancy problem encountered in the context of the monitoring or tracking of objects or living beings by means of tracking modules (also called "trackers") associated with each object or living being to be monitored: when the objects or living beings are co-located, and therefore share similar geolocation information supplied by geolocation sensors respectively embedded in the tracking modules, the transmission of this location information to a group management unit, which can be implemented by a remote platform, leads to the use of resources at each tracking module sending data to the management unit, and therefore increased use of resources at the group level, to transmit almost identical geolocation information—and therefore redundant to a certain extent—to the group management unit. The provided method makes it possible to entrust this transmission of geolocation information relating to the group to only a limited number of tracking modules (typically only one) operating in the representative mode, which transmit information to the group management unit (in this case geolocation information) that is valid for the whole group. The provided method thus avoids a waste of resources (in particular energy, bandwidth, and/or addressing resources, depending on the situation) where each tracking module is sending almost the same geolocation information and is doing so independently of the other modules of the module group although they are in close proximity.

According to one or more embodiments of the provided method, position information (geolocation) is only sent from a single tracking module, taking into account the other trackers in the immediate vicinity (for example by means of their identifiers). This "representative" tracking module can be configured to detect the immediate proximity of other tracking modules, and to keep a regular inventory, via a simple local communication that is wireless and low-power (for example using BLE technologies (for "Bluetooth Low Energy"), ZigBee, Z-Wave, etc.). The scope of the local detection and the inventory frequency may vary depending on the embodiment, and may depend on the type of tracking desired and the use cases envisaged.

The provided method thus advantageously makes it possible to implement a solution for inventorying tracking modules in a group of tracking modules that consumes few resources, by entrusting the management of the inventory function for the group (including transmission of any alarms generated by this function) to a limited number of tracking modules of the group.

The features set forth in the following paragraphs may optionally be implemented. They may be implemented independently of each other or in combination with one another:

In one or more embodiments of the provided method, a remote management platform may comprise the group management unit, and the transmission of representative node data to the group management unit may comprise: transmitting the representative node data to the management platform via a second wireless communication network.

In one or more embodiments, the provided method may further comprise, when the node is operating in the representative mode and when the group comprises a second node: receiving data originating from the second node via a first wireless communication network formed by the nodes of the group, and generating the representative node data based on the received data.

In one or more embodiments, the provided method may further comprise: activating an operation in the representative mode upon receipt of a request to operate in the representative mode.

In one or more embodiments, the provided method may further comprise: activating an operation in the represented mode upon receipt of a message identifying another node of the group operating in the representative mode.

In one or more embodiments of the provided method, the plurality of operating modes configured on the node may further comprise a represented mode, and the provided method may further comprise, when the node is operating in the represented mode, generating represented node data: identifying another node of the group which is operating in the representative mode, and transmitting the represented node data to the identified node for transmission to the group management unit.

In one or more embodiments, the provided method may further comprise, when the node is operating in the representative mode: upon detecting the occurrence of a representative change event, identifying another node of the group to succeed the node as a node operating in the representative mode.

In one embodiment, identifying the other node in the group to succeed the node as a node operating in the representative mode may comprise: transmitting to at least one other node in the group a request to change the representative node.

In one or more embodiments, the provided method may further comprise: identifying the other node according to a list of nodes of the group defining a sequence of nodes operating in the representative mode.

In one embodiment, identifying the other node in the group may comprise: verifying that the other identified node can enter representative mode.

In one or more embodiments of the provided method, detecting the occurrence of the representative change event may comprise: receiving a message originating from the group management unit.

In one or more embodiments of the provided method, the representative change event may comprise one among a group comprising: an expiration of a representative mode duration monitoring timer, a battery level relative to a predetermined battery level threshold, and a link quality level relative to a predetermined link quality threshold.

According to another aspect, a device is provided comprising a processor and a radio-frequency unit operatively coupled to the processor, the device being configured to implement a method according to one of the embodiments provided in the present description.

Another aspect relates to a computer program, loadable into a memory associated with a processor, and comprising portions of code for implementing a method as provided in the present description during execution of said program by the processor.

Another aspect relates to a set of data representing, for example through compression or encoding, a computer program as provided in the present description.

Another aspect relates to a non-transitory storage medium for a computer-executable program, comprising a set of data representing one or more programs, said one or more programs comprising instructions for, when said one or more programs is executed by a computer comprising a processor operatively coupled to a memory and to a data communication I/O interface, causing the computer to manage a data communication node according to a method for managing a data communication node according to one of the embodiments provided in the present description.

BRIEF DESCRIPTION OF THE DRAWINGS

Other features and advantages of the present subject disclosure will be apparent from the following description of some non-limiting embodiments, with reference to the accompanying drawings, in which.

DETAILED DESCRIPTION OF CERTAIN ILLUSTRATIVE EMBODIMENTS

Figure 1A:
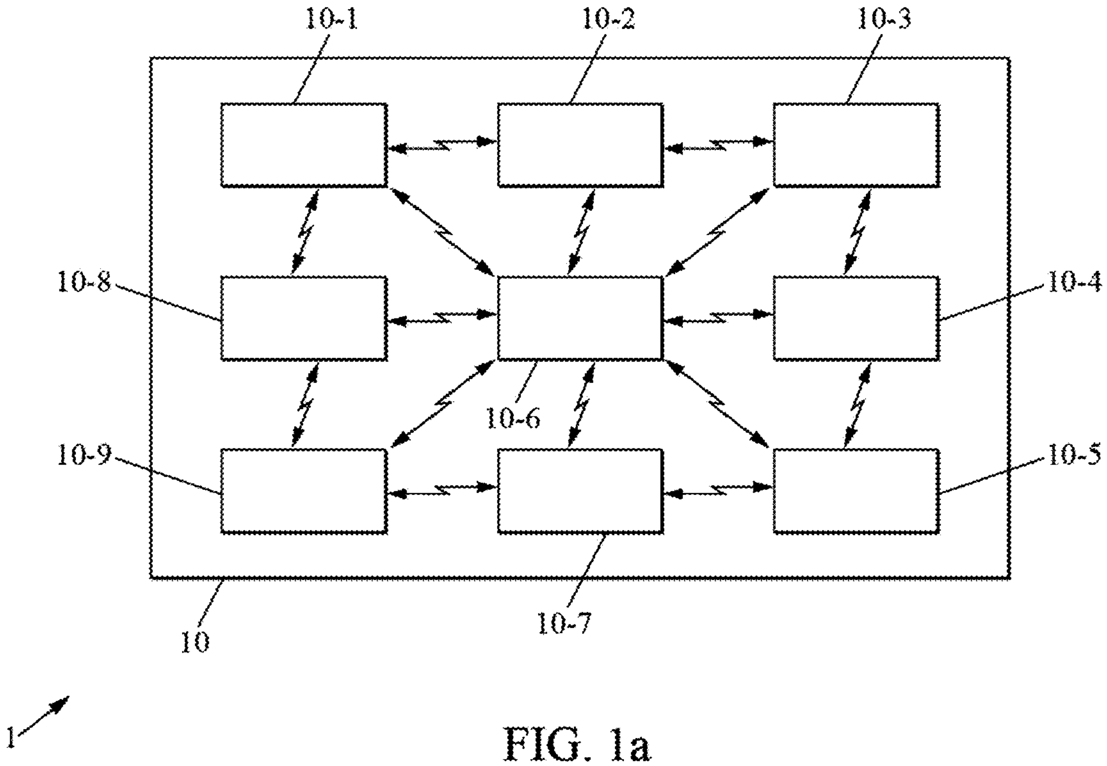
FIG. 1*a* is a diagram illustrating an example of a system for implementing one or more embodiments of the provided method.

In the following detailed description of embodiments of the present subject disclosure, many specific details are presented to provide a more complete understanding. Nevertheless, a person skilled in the art will realize that some embodiments can be applied without these specific details. In other cases, well-known characteristics are not described in detail in order to avoid unnecessarily complicating the description.

This description refers to functions, motors, units, modules, platforms, and diagram illustrations of methods and devices according to one or more embodiments. Each of the functions, motors, modules, platforms, units and diagrams described may be implemented in hardware, software (including as embedded software ("firmware"), or as "middleware"), microcode, or any combination thereof. In the case of implementation in software form, the functions, motors, units, modules and/or diagram illustrations may be implemented by computer program instructions or software code, which can be stored or transmitted on a computer-readable medium, including a non-transitory medium, or a medium loaded in the memory of a generic or specific computer, or of any other apparatus or device programmable for data processing to produce a machine, such that the computer program instructions or the software code executed on the computer or the apparatus or device programmable for data processing constitute means for implementing these functions.

Embodiments of a computer-readable medium include, but are not limited to, computer storage media and communication media, including any medium facilitating the transfer of a computer program from one location to another. "Computer storage medium/media" is understood to mean any physical medium that can be accessed by a computer. Examples of computer storage media include, but are not limited to, flash memory disks or components or any other flash memory devices (for example USB keys, memory sticks, flash drives, keychain drives), CD-ROMs or other optical data storage devices, DVDs, magnetic disk data storage devices or other magnetic data storage devices, data memory components, RAM, ROM, EEPROM, memory cards ("smart cards"), SSD type memories ("Solid State Drive"), and any other form of medium that can be used to transport or store or save data or data structures which can be read by a computer processor.

In addition, various forms of computer-readable media can transmit or carry instructions to a computer, such as a router, gateway, server, or any data transmission device, whether via wired transmission (by coaxial cable, optical fiber, telephone wires, DSL cable, or Ethernet cable), wireless transmission (by infrared, radio, cellular, microwave), or virtualized transmission devices (virtual router, virtual gateway, virtual tunnel endpoint, virtual firewall). The instructions may, depending on the embodiments, comprise code of any computer programming language or computer program element, such as, without limitation, assembly languages, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

In addition, the terms "in particular", "for example", "example", "typically" are used in the present description to denote examples or illustrations of non-limiting embodiments, which do not necessarily correspond to preferred or advantageous embodiments compared to other possible aspects or embodiments.

"Server" or "platform" is understood in the present description to mean any point of service (virtualized or not) or device providing data processing, one or more databases, and/or data communication functions. For example, and without limitation, the term "server" or the term "platform" may refer to a physical processor operatively coupled with associated communication, database, and data storage functions, or may refer to a network, group, assembly, or complex of processors and associated data storage and networking devices, as well as an operating system and one or more database system(s) and application software in support of the services and functions provided by the server. A computing device may be configured to send and receive signals, by wireless and/or wired transmission network(s), or may be configured for processing and/or storing data or signals, and can therefore operate as a server. Thus, devices configured to operate as a server may include, by way of non-limiting examples, dedicated rack-mounted servers, desktops, laptops, service gateways (sometimes referred to as "boxes" or "residential gateways"), multimedia decoders (sometimes referred to as "set-top boxes"), integrated devices combining various functionalities such as two or more of the functionalities mentioned above. Servers can vary widely in their configuration or capabilities, but a server will typically include one or more central processing unit(s) and memory. A server may also include one or more mass memory device(s), one or more power supply(ies), one or more wireless and/or wired network interface(s), one or more input/output interface(s), one or more operating system(s), such as Windows Server, Mac OS X, Unix, Linux, FreeBSD, or an equivalent.

The terms "network" and "communication network" as used in the present description refer to one or more data links which can couple or connect devices, possibly virtualized, so as to allow the transport of data between computer systems and/or modules and/or other electronic devices or equipment, such as between a server and a client device or other types of devices, including between wireless devices coupled or connected by a wireless network, for example. A network may also include mass memory for storing data, such as a NAS ("network attached storage"), a SAN ("storage area network"), or any other form of media readable by a computer or by a machine, for example. A network may comprise, in whole or in part, the Internet network, one or more local area networks (or LANs), one or more WAN type networks (Wide area networks), wired connections, wireless connections, cellular connections, or any combination of these different networks. Similarly, subnets may use different architectures or be compliant or compatible with different protocols, and interoperate with larger networks. Different types of devices can be used to make the different architectures or protocols interoperable. For example, a router can be used to provide a communication link or a data link between two LANs that would otherwise be separate and independent.

The terms "operatively coupled", "coupled", "mounted", "connected", and their various variants and forms used in the present description refer to couplings, connections, assemblies, which may be direct or indirect, and in particular comprise connections between electronic devices or between portions of such devices which enable operations and functions as described in the present description. In addition, the terms "connected" and "coupled" are not limited to physical or mechanical connections or couplings. For example, an operative coupling may include one or more wired connection(s) and/or one or more wireless connection(s) between two or more devices, which enable simplex and/or duplex communication links between the devices or portions of the devices. According to another example, an operative coupling or a connection may include a coupling by wired and/or wireless link to enable data communications between a server of the provided system and other device of the system.

The terms "application" or "application program" (AP) and their variants ("app", "webapp", etc.) as used in the present description correspond to any tool which functions and is operated by means of a computer, in order to provide or execute one or more function(s) or task(s) for a user or another application program. To interact with and control an application program, a user interface may be provided on the device on which the application program is implemented. For example, a graphical user interface (GUI) may be generated and displayed on a screen of the user device, or an audio user interface may be played to the user using a loudspeaker, headphones, or an audio output.

FIG. 1*a* is a diagram illustrating one or more embodiments in which a system (1) comprises a set (10) of devices (10-1, 10-2, 10-3, 10-4, 10-5, 10-6, 10-7, 10-8, and 10-9) forming a group, each device (10-1, 10-2, 10-3, 10-4, 10-5, 10-6, 10-7, 10-8, and 10-9) of the group comprising a wireless communication module enabling the exchange of data with one or more other devices of the group so as to form a network of data communication nodes.

The set (10) of data communication nodes thus form a set of connected objects that are networked. Depending on the embodiment, the communication network may use different network technologies (radio network or optical network), and implement a topology and communication protocols suitable for the chosen technology. Those skilled in the art will understand that the provided method is not limited to a particular network topology (mesh network, star network, point-to-point network, point-to-multipoint network, etc.) or to a particular network technology, and that any network topology and technology allowing each node of the network to communicate with at least one other node of the network can be used for implementing embodiments.

For example, in one or more embodiments, the network formed by the data communication nodes may be of the low-power radio communication network type, and use communication links of types such as "Bluetooth", "Bluetooth Low Energy" (BLE), "Bluetooth smart", WiFi or any communication link based on IEEE802.11x protocols, "Zigbee" or any communication link based on IEEE802.15.4 protocols, "Z-Wave", "6LowPAN" (IPv6 Low-power wireless Personal Area Network), "Thread", "Sigfox", "Neul", "LoRa", or based on the specifications developed by the 3GPP group for "LTE-M" networks, or any near field communication (NFC) type of link.

According to another example, in one or more embodiments, the network formed by the data communication nodes may be of the optical communications network type, and use communication links of the "LiFi" type ("Light Fidelity").

In one or more embodiments, the network formed by the communication nodes is of the M2M type ("Machine-to-machine"), in which each node can be configured to communicate with the set of other nodes in the network.

Figure 1B:
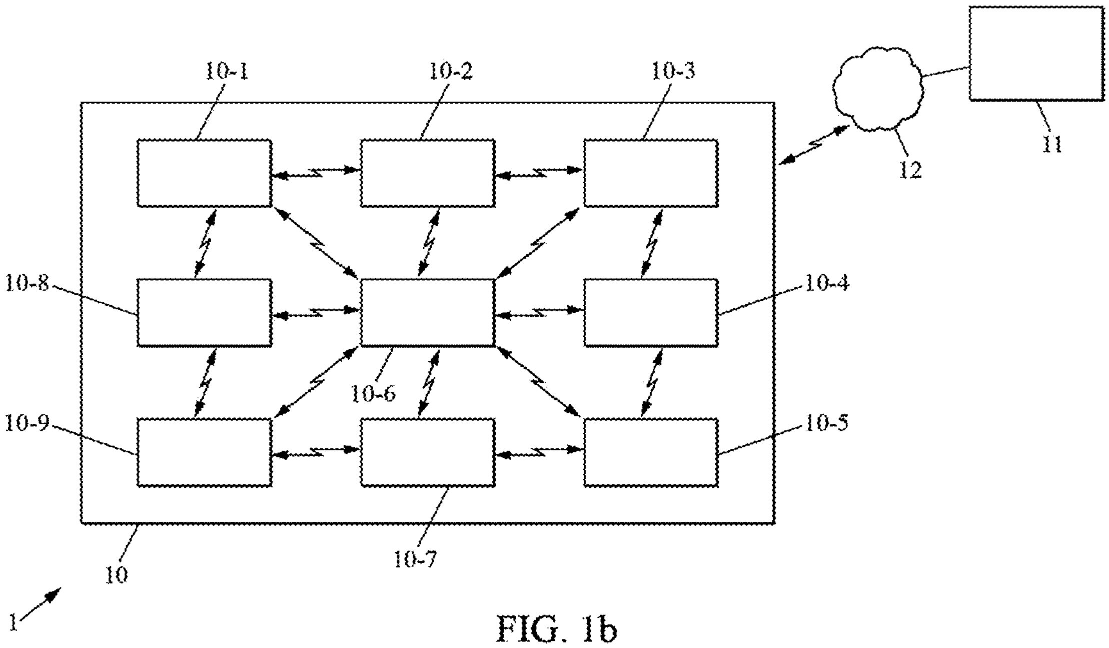
FIG. 1*b* is a diagram illustrating an example of a system for implementing one or more embodiments of the provided method.

FIG. 1*b* is a diagram illustrating one or more embodiments in which the system (1) illustrated in FIG. 1*a* further comprises a management platform 11. In this case, each communication node (10-1, 10-2, 10-3, 10-4, 10-5, 10-6, 10-7, 10-8, and 10-9) of the group can be further configured to communicate with the management platform 11 by means of one or more network(s) (12) comprising a communication network, to which a service gateway, commonly called a "box", is connected. Each communication node (10-1, 10-2, 10-3, 10-4, 10-5, 10-6, 10-7, 10-8, and 10-9) will preferably be configured so that the communication link with the service gateway is wireless, for example using WiFi® data communication technology or Zigbee® technology, or a wireless communication technology of the Bluetooth® type (and in particular Bluetooth Low Energy®, or BLE), or Z-Wave® and an IEEE 802.15.4 type of communication protocol.

Depending on the embodiment, each communication node (10-1, 10-2, 10-3, 10-4, 10-5, 10-6, 10-7, 10-8, and 10-9) and the management platform 11 may be interconnected and exchange data over one or more communication link(s), using one or more networks of different types, such as a fixed network, a cellular network (for example according to standards such as 2G (GSM, GPRS, EDGE), 3G (UMTS), 4G (LTE), LTE-A, LTE-M, CDMA, CDMA2000, HSPA, 5G, or their variants or upgrades), another type of radio network (for example WiFi® or Bluetooth®), an IP network, a combination of several of these networks, etc.

A resource space (processing, memory, etc.) can thus be allocated in one or more embodiments to the group (10) of communication nodes in the management platform 11. In the embodiment illustrated by FIG. 1*b*, the management platform 11 is connected to the network 12, such that data can be transmitted between the platform 11 and a communication node (10-1, 10-2, 10-3, 10-4, 10-5, 10-6, 10-7, 10-8, and 10-9). In one or more embodiments, the management platform 11 may be hosted by one or more servers, for example in a cloud. This or these servers, which may be any type of device or system comprising data processing means, such as a computer, a set of interconnected computers (in the context of a virtualized network for example), and comprise and/or be connected to one or more databases in order to store data, can be configured to exchange data with one or more communication nodes (10-1, 10-2, 10-3, 10-4, 10-5, 10-6, 10-7, 10-8, and 10 9), and in particular to receive representative node data from one or more communication nodes (10-1, 10-2, 10-3, 10-4, 10-5, 10-6, 10-7, 10-8, and 10-9).

In one or more embodiments, the management platform 11 may be provided with an application programming interface ("API"), or any other type of interface (not shown in FIG. 1*b*), configured to transmit data to and receive data from one or more communication nodes (10-1, 10-2, 10-3, 10-4, 10-5, 10-6, 10-7, 10-8, and 10-9), and in particular to receive representative node data.

Figure 2:
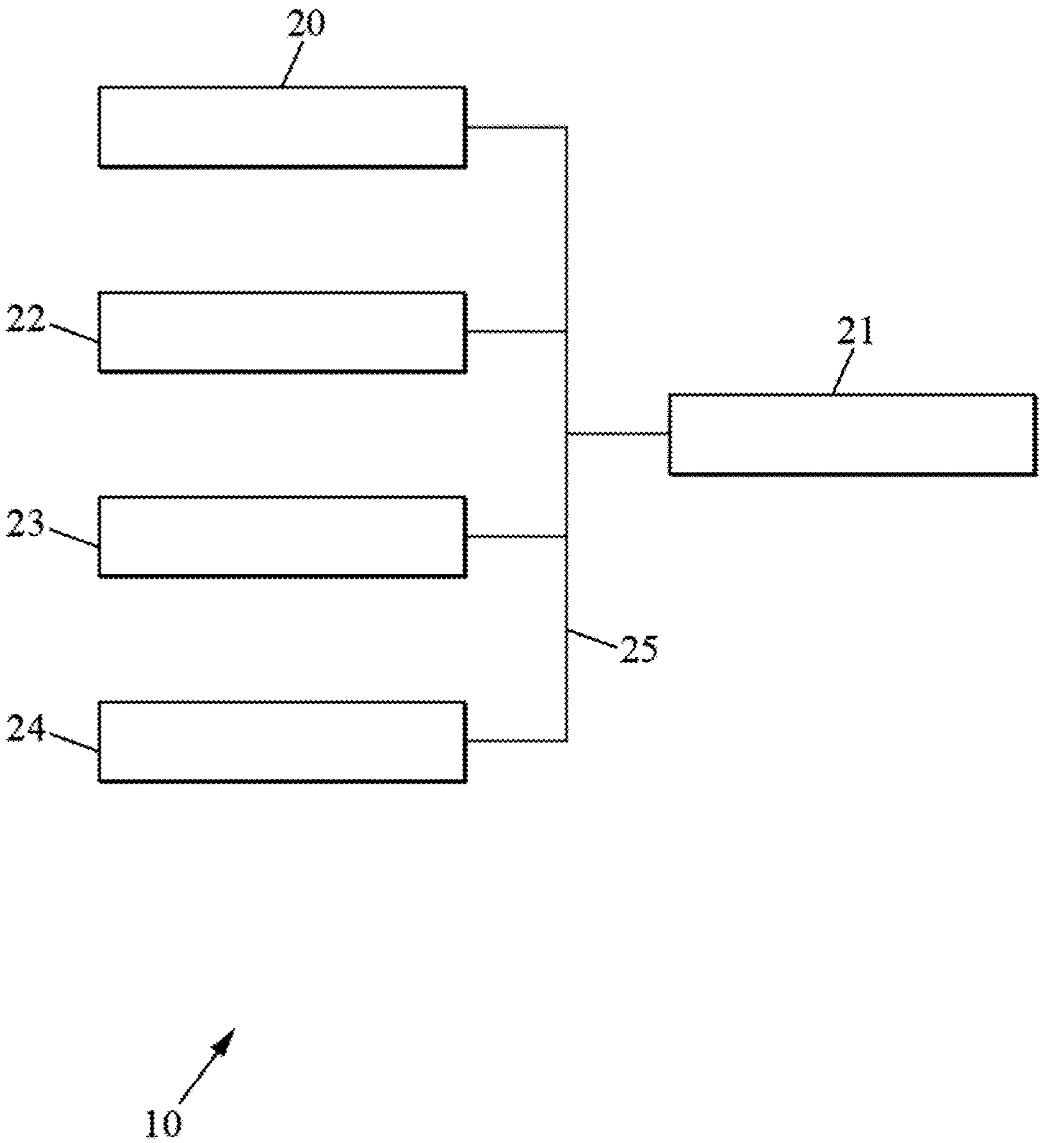
FIG. 2 is a diagram illustrating an example architecture of a data communication node for implementing one or more embodiments of the provided method.

Referring to FIG. 2, in one or more embodiments, each communication node (10) (for example each of the communication nodes (10-1, 10-2, 10-3, 10-4, 10-5, 10-6, 10-7, 10-8, and 10-9) of FIGS. 1*a* and 1*b*) may comprise a wireless communication unit (20), a controller (21), a power supply unit (22), and a management unit (23). Some of the communication nodes may further comprise a functional unit (24). Depending on the embodiment, the wireless communication unit (20), the power supply unit (22), the management unit (23), and where appropriate the functional unit (24), may be operatively coupled to the controller (21) by a communication bus (25), or by any communication link, possibly comprising one or more hardware connectors. In the architecture of the communication node (10) illustrated in FIG. 2, the set of wireless communication units (20), controller (21), power supply unit (22), management unit (23), functional unit (24), and communication bus (25) forms a communication node according to one or more embodiments, which may include other components, units, functions, not shown in the figure.

The controller (21) may comprise one or more processors, such as a microprocessor, microcontroller, or other hardware processor, associated memory (for example random access memory (RAM), cache memory, flash memory, etc.), and be able to be configured to control the wireless communication unit (20), the power supply unit (22), the management unit (23), and where appropriate the functional unit (24), in order to control the use of the communication node (10) according to one or more embodiments of the provided method, for example by executing a computer program comprising portions of code for implementing a method for managing a communication node as provided in the present description. Depending on the embodiment, a memory associated with the controller (21), external or internal to the controller (21), contains instructions which, when executed by the controller (21), cause this controller (21) to perform or control the wireless communication unit (20), power supply unit (22), management unit (23), and/or where appropriate functional unit (24), portions of the exemplary implementations of the provided method described in the present description. The controller (21) may be a component implementing a processor or a computing unit for managing a communication node according to the provided method and for controlling the management unit (23) of the device (10), such as for example a microcontroller.

The management unit (23) may be implemented, depending on the embodiment chosen, in the form of one or more software items, or a combination of one or more hardware items and one or more software items, configured to implement embodiments of the management method described in the present description. In particular, the communication node (10) may be configured via the management unit (23) to operate according to a plurality of operating modes, among which are an operating mode referred to as "representative mode" and an operating mode referred to as "represented mode", and to operate in the representative mode and/or in the represented mode according to one or more embodiments described in the present description.

The software portion of the management unit (23) may constitute or be part of driver software for controlling the data communication node. In what follows, the term "driver" will denote a set of one or more software items configured to implement a method for managing a communication node provided in the present description. Depending on the architecture of the communication node, the driver is configured to be executable on a processor of the communication node, and/or on a processor of a computing device to which part of the communication node is connected.

The wireless communication unit (20) may be implemented, depending on the embodiment chosen, as a combination of one or more hardware items and one or more software items, and may comprise one or more radiofrequency and/or optical communication devices, and a communication unit driver, for example executable by the controller (21), or, in another architecture of the communication node, executable by a processor of the wireless communication unit (20), and loaded into memory accessible by a processor configured to execute the communication unit driver. In one or more embodiments, the wireless communication unit (20) may comprise a data communication interface.

For example, as discussed above, the wireless communication unit (20) could be configured to use communication links of types such as "Bluetooth", "Bluetooth Low Energy" (BLE), "Bluetooth smart", WiFi or any communication link based on IEEE802.11x protocols, "Zigbee" and/or any communication link based on IEEE802.15.4 protocols, "Z-Wave", "6LowPAN" (IPv6 Low-power wireless Personal Area Network), "Thread", "Sigfox", "Neul", "LoRa", and/or based on the specifications developed by the 3GPP group for "LTE-M" networks, any near-field communication (NFC) type of link, and/or any "LiFi" ("Light Fidelity") type of communication link.

The power supply unit (22) may be implemented, depending on the embodiment chosen, as a combination of one or more hardware items and one or more software items, and comprise one or more electrical power supply hardware items, such as one or more batteries, and a power supply driver, for example executable by the controller (21), or, in another architecture of the communication node, executable by a processor of the power supply unit (22), and loaded into memory accessible by a processor configured to execute the communication unit driver. In one or more embodiments, the power supply driver may be configured to generate status data for the battery/batteries of the communication node (10), and in particular to generate an alert when the charge level of the battery or batteries of the communication node (10) exceed a predetermined threshold. Once generated, the alert may be transmitted in particular to the management unit (23), for example by the generation of a dedicated interrupt.

The communication node device (10) may be implemented in software form, in which case it takes the form of a program executable by a processor, or in hardware form, such as an application-specific integrated circuit (ASIC), a system-on-chip (SOC), or in the form of a combination of hardware and software elements, for example such as a software program intended to be loaded and executed on an FPGA (Field Programmable Gate Array) type of component. SOCs (System-On-Chip) are embedded systems that integrate all components of an electronic system into a single chip. An ASIC (Application-Specific Integrated Circuit) is a specialized electronic circuit that groups together functionalities tailored to a given application. ASICs are typically configured at the time of manufacture and can only be simulated by the user. Field-Programmable Gate Array (FPGA) type programmable logic circuits are electronic circuits that can be reconfigured by the user.

The communication node device (10) may also use hybrid architectures, for example such as architectures based on a CPU+FPGA, a GPU (Graphics Processing Unit), or an MPPA (Multi-Purpose Processor Array).

Depending on the embodiment, different architectures of the communication node device (10) may be adopted, for both the hardware portion of the device and the software portion of the device, where applicable.

In one or more embodiments, a plurality of nodes of the network may embed a functional unit (24), configured to generate status information relating to the node in which it is embedded. Alternatively, one or more nodes of the network could be coupled to a functional unit (24) so as to receive status information generated by the functional unit (24).

Depending on the embodiment, this functional unit (24) may comprise one or more sensors, each capable of generating status information for the node, for example such as a temperature sensor, an air quality sensor, a geographic location sensor, a position sensor, and/or a humidity sensor, etc. These sensors can be used according to the provided method depending on the use case, and in particular depending on the functional context in which the embodiment of the provided method is implemented.

Those skilled in the art will understand that the provided method is not limited to a particular architecture of the communication node (10), wireless communication unit (20), controller (21), power supply unit (22), management unit (23), functional unit (24), and communication bus (25), or of the coupling between these elements illustrating an embodiment in FIG. 2 by way of example.

Methods are described below for managing a communication node in a group, such as the one illustrated in FIGS. 1*a*, 1*b* and 2 in one or more embodiments.

Figure 3A:
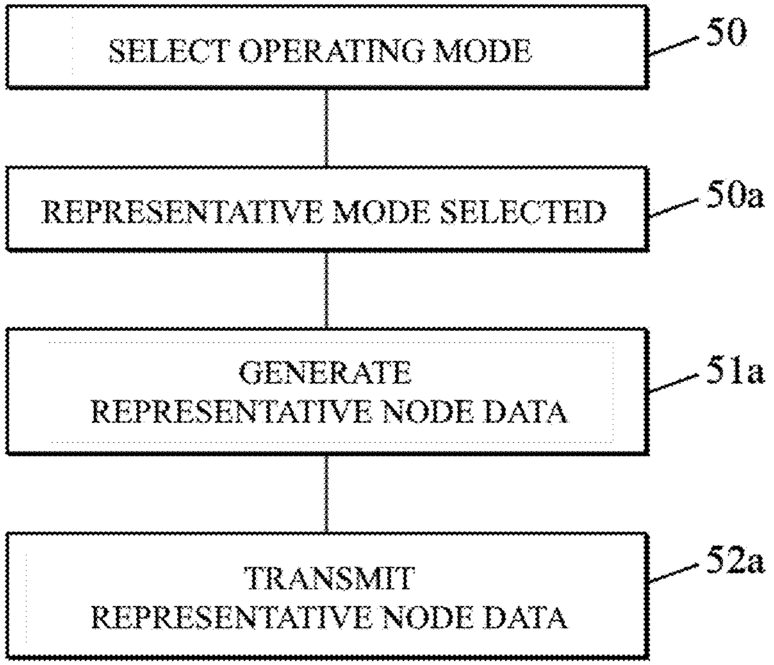
FIG. 3*a* is a diagram illustrating the provided method according to one or more embodiments.

Referring to FIG. 3*a*, a data communication node belonging to a data communication group selects (50) an operating mode among a plurality of operating modes configured on the node and comprising a representative mode.

In one or more embodiments, at least one of the group's communication nodes can be configured to operate in a plurality of operating modes comprising a representative mode, but not necessarily a represented mode. The group's communication nodes can thus have different configurations, hardware and/or software, corresponding to different types of device. Some of these devices may advantageously be provided with sufficient resources that they do not to have to function, including intermittently, in the mode shown. Other devices may be configured to operate intermittently in the representative mode then in the represented mode, and vice versa.

In one or more embodiments, the selection of operating mode may be synchronized across all nodes in the group so that only one node in the group selects representative mode.

The communication node may be configured to generate (51*a*) representative node data when representative mode is selected (50*a*), and to transmit (52*a*) the representative node data to a group management unit. The operation in the representative mode advantageously makes it possible to transmit representative node data which comprise data relating to another node of the group, which will typically operate in the represented mode. Thus, operation in the representative mode advantageously makes it possible to centralize the supplying of data relating to other nodes of the group to the node of the group which is operating in the representative mode, and thus to call upon resources (in particular energy, bandwidth, and addressing resources) for this data transmission only at the node operating in the representative mode. This results in saving resources, and in particular the battery of the communication nodes, and in reducing wear on the group's communication nodes, the data transmission by each node not taking place directly with the group management unit but through the communication node by using the local area network (typically low-power) allowing the nodes of the group to communicate with each other.

It may therefore be advantageous, in one or more embodiments, to configure a set of communication nodes so that the groups of communication nodes are sized so that only one communication node of a group is operating in the representative mode at a given time, while having sufficient resources to transmit the data received from the other nodes of its group to a group management unit.

Depending on the embodiment, the group management unit may be one of the communication nodes of the group, a device configured to communicate with at least one of the communication nodes of the group through one or more network(s). For example, with reference to FIG. 1*b*, in one or more embodiments the group management unit could be hosted on a remote management platform (11), in which case the communication node operating in the representative mode could be configured to transmit representative node data, which will typically comprise data relating to another node in the group, to the remote management platform (11) which will be configured to process the data received from the node operating in the representative mode.

In one or more other embodiments, the group management unit may be hosted within a device accessible by a local data network (typically a LAN, standing for "Local Area Network") for the transmission of representative node data.

For example, in the case of communication nodes implemented on geolocation tracking devices ("trackers") placed on objects stored in a storage location (for example a warehouse), each communication node may be configured to transmit data relating to another communication node (for example one or more alarms relating to the geolocation of the object tracked by this other node, and/or relating to a status of the tracked object and/or its communication node (power supply state, abnormally high humidity level, temperature outside a set interval, etc.)) to a locally accessible group management unit configured to process the data received from a node operating in the representative mode.

In one or more other embodiments, one or more communication nodes of the group may be configured to comprise a group management unit to which the representative node data will be transmitted. In order to take full advantage of the pooling of resources within the group of communication nodes, it may be configured to include only a single communication node hosting a group management unit.

Figure 3B:
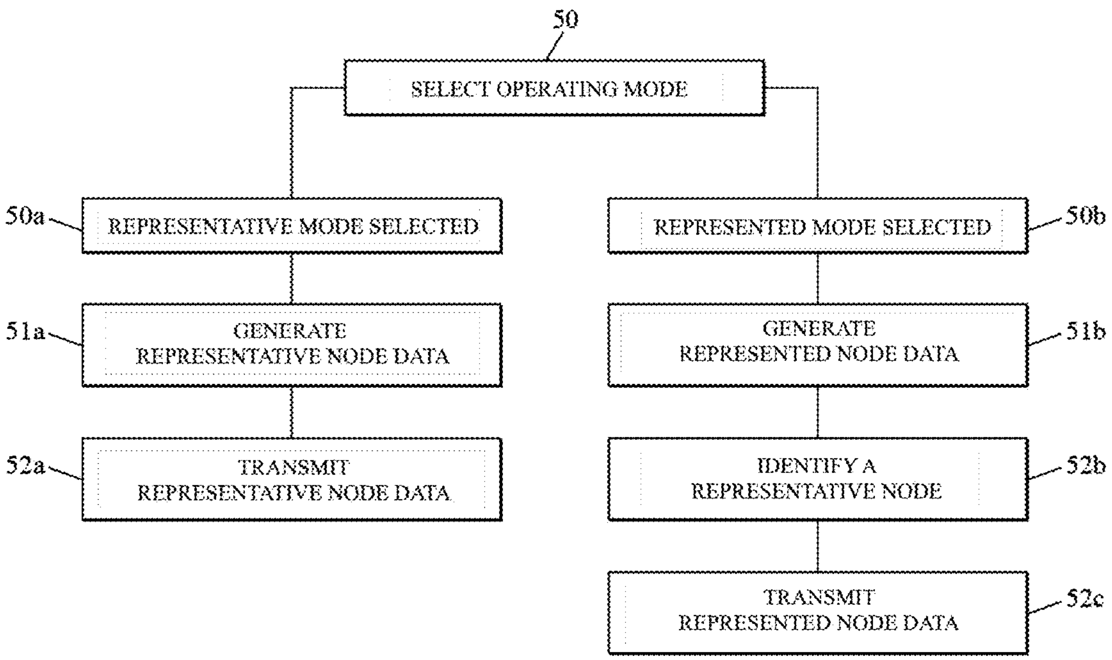
FIG. 3*b* is a diagram illustrating the provided method according to one or more embodiments.

Referring to FIG. 3*b*, a data communication node belonging to a data communication group selects (50) an operating mode among a plurality of operating modes configured on the node and comprising a representative mode and a represented mode. The communication node can thus be configured with a plurality of operating modes comprising a representative mode and a represented mode.

Each data communication node can thus advantageously be configured, in one or more embodiments, to operate according to a first operating mode in which it acts, in addition to its other functions, as representative of the group of communication nodes to which it belongs, and according to a second operating mode in which it acts, in addition to its other functions, as represented by another node of the group of data communication nodes to which it belongs. Each communication node of the group can advantageously be configured to switch from representative mode to represented mode, and vice versa, so as not to operate continuously in the same operating mode with no change of operating mode being possible for this node.

In particular, each communication node of a group may be configured in one or more embodiments to be functionally identical to the other communication nodes of the group with respect to the operation in representative and represented modes.

The above description relating to the operation of a node, in one or more embodiments, once representative mode has been selected, with reference to FIG. 3*a*, is applicable to the embodiment illustrated by FIG. 3*b*: The communication node can be configured to generate (51*a*) representative node data, when representative mode is selected (50*a*), and to transmit (52*a*) the representative node data to a group management unit.

The communication node may further be configured to generate (51*b*) represented node data, when represented mode is selected (50*b*). The represented node data may for example be generated on the basis of data generated by a functional unit coupled to the communication node within a device. This functional unit may comprise one or more sensors providing data representing measurements (for example geolocation, temperature, pressure, humidity, and/or air quality) to the communication node, which can then process these received data, the processing comprising for example a reformatting, a combining of these data, the addition of a CRC code, etc., in order to generate the represented node data.

In one or more embodiments, the node operating in the represented mode can identify (52*b*) one or more nodes of the group of communication nodes currently operating in the representative mode. Depending on the embodiment, this identification may be carried out by means of a lookup table stored in the local memory of the communication node, listing all nodes of the group of communication nodes (for example by an identifier which may be a network identifier or a network address) and, for each listed node belonging to the group, a current status indicating whether the node concerned is operating in the representative mode or in the represented mode.

When at least one communication node operating in the representative mode is identified, the communication node operating in the represented mode may transmit (52*c*) the generated data for the represented node to the identified communication node operating in the representative mode.

In one or more embodiments, where the communication nodes operating in the represented mode multicast or broadcast their represented node data, a communication node operating in the represented mode does not need to identify the communication node operating in the representative mode. As the multicast or broadcast transmission does not require individual recipient addressing, it is sufficient for a communication node operating in the represented mode to know that it itself is not the communication node operating in the representative mode.

In one or more embodiments, the representative node may be configured to receive data from another node of the group by means of the wireless communication network of the group, and to generate representative node data on the basis of the data received.

The wireless communication network of the group will preferably be chosen for the possibility of transmitting short messages (typically a few kilobytes of data) between communication nodes of the group which place little strain on the sending node, in particular in its use of resources such as power and bandwidth, so that the nodes of the group are preserved when they are not operating in the representative mode. Thus, the provided system reduces the wear and energy consumption of the provided communication nodes, since none of the nodes in the group are continuously operating in the representative mode.

To this end, the provided communication nodes can advantageously be configured so that operation in the representative mode is distributed over time among the communication nodes of a group.

The following describes methods for configuring a communication node which allow designating a communication node for operation in the representative mode.

In one or more embodiments, when a node is operating in the representative mode, detecting the occurrence of an operating mode change event, among one or more operating mode change events configured on the node, may trigger a change of operating mode for that node in order to exit operation in the representative mode, and the designation of one or more other nodes of the group to operate in the representative mode in place of the node leaving operation in the representative mode.

In one or more embodiments, an operating mode change event configured on the communication node may be associated with a timer configured on the node with a value corresponding to a maximum duration that the communication node can operate in the representative mode before it exits this mode at the end of this duration. Depending on the embodiment, this maximum duration may be preconfigured at a fixed value T for the node, or may be configured dynamically, for example as a function of a weight factor w representing a battery level measurement, at a value T.w determined when the timer is triggered as the node enters representative mode.

In one or more embodiments, another operating mode change event configured on the communication node may be associated with a battery level relative to a predetermined battery level threshold. In this case, the communication node can be configured to repeatedly monitor its battery level, compare it to the predetermined threshold, and exit representative mode when its battery level reaches the predetermined threshold. This embodiment advantageously makes it possible to avoid prematurely draining the battery of a communication node by keeping it operating in the representative mode, an operation which typically can consume more resources of the node than operation in other modes, and particularly in the represented mode or in a standby mode.

In one or more embodiments, another operating mode event change configured on the communication node may be associated with a link quality level relative to a predetermined link quality threshold. In this case, the communication node can be configured to repeatedly monitor the quality level of the communication links used during operation in the representative mode (and in particular the quality level of the wireless link between the communication node and the group management unit), compare it to the predetermined threshold, and exit representative mode when its link quality level reaches the predetermined threshold. This embodiment advantageously makes it possible to avoid keeping a communication node operating in the representative mode when it might no longer be able to fulfill its functions of representing the group due to a drop in quality of a communication link used during its operation in the representative mode.

In one or more embodiments, detecting the occurrence of an operating mode change event may comprise receiving a message, for example from a management unit of the group of communication nodes, or from another node of the group of communication nodes.

In one embodiment, the change of operating mode of a node operating in the representative mode and/or the designation of one or more successors of this node may be managed centrally, for example by the group management unit which, in one or more embodiments, may comprise a remote management platform, as illustrated in FIG. 1*b*. The group management unit can thus be configured to control for the group the operation in the representative mode of one or more nodes of the group, and to transmit a message to a node of the group operating in the representative mode requesting that the node leave representative mode. The control of the operation in the representative mode for the group may further include designating another node of the group and transmitting to that other node a message requesting that the node enter representative mode.

In one or more embodiments, the control of the operation in the representative mode for the group may comprise sending, to all nodes in the group or to a plurality of nodes in the group (for example using broadcast or multicast mode), an operating mode change message comprising identification data of a node of the group. Upon receiving this message, each communication node can process the identification data of a node of the group, and modify its operating mode according to these data.

In one or more embodiments, for a communication node not operating in the representative mode, if the identification data matches that node, the received message can be interpreted as a request to operate in the representative mode, intended for that node.

Otherwise, meaning if the identification data does not match that node, the received message can be interpreted as a request to operate in the representative mode intended for another node, and can be used, where appropriate, to update an operating status table relating to the operating mode, in particular for the other node identified by the identification data. In an embodiment where the control of the operation in the representative mode for the group is configured to have only one communication node operating in the representative mode for the group at a given moment, the received message can further be interpreted as an operating mode change request to exit representative mode, intended for the node operating in the representative mode, and can be used where appropriate to update an operating status table relating to the operating mode, in order to update the status of the node operating in the representative mode and being requested to exit this mode.

For a communication node operating in the representative mode, if the identification data correspond to that node, the message received can be interpreted as an operating mode change request to leave representative mode, intended for that node.

Otherwise, meaning if the identification data does not match that node, the received message can be interpreted as a request to operate in the representative mode intended for another node, and can be used, where appropriate, to update an operating status table relating to the operating mode, in particular for the other node identified by the identification data being called upon to operate in the representative mode. In an embodiment where control of the operation in the representative mode for the group is configured to have only one communication node of the group which operates in the representative mode at a given moment, the received message can further be interpreted as an operating mode change request to exit representative mode, intended for the node operating in the representative mode, and can be used, where appropriate, to update an operating status table relating to the operating mode, in order to update the status of the node operating in the representative mode and being requested to exit this mode.

In other embodiments, control of the operation in the representative mode for the group may comprise sending, to all nodes in the group or to a plurality of nodes in the group (for example using broadcast mode or multicast mode), an operating mode change message comprising identification data for a first and a second node of the group. The nodes of the group can then be configured to interpret this message as containing a request to operate in the representative mode intended for the first node, and a request to change the operating mode to leave representative mode intended for the second node, and as a result to act as described above upon receipt of this message (entering or not entering representative mode, exiting or not exiting representative mode, where appropriate updating its operating mode status table).

In one or more embodiments, in particular in configurations in which control of the operation in the representative mode is centralized, for example at a group management unit, one or more communication nodes of the group may be configured to receive a message requesting operation in the representative mode (for example transmitted in unicast mode) and, upon receipt of this message, exit their current operating mode to enter operation in the representative mode by activating an operation in the representative mode.

Similarly, in one or more embodiments, one or more communication nodes of the group could be configured to receive a message requesting a change of operating mode to leave representative mode (for example transmitted in unicast mode) and, upon receipt of this message, exit their current representative mode to enter an operation other than representative mode. In the embodiments in which these nodes are configured to operate in the representative mode and in the represented mode, they may further be configured to exit their current representative mode and enter represented mode.

In one or more embodiments, one or more communication nodes of the group may be configured, upon receipt of a message requesting an operation in the representative mode which identifies them (whether by identification data in the case of a message broadcast to all nodes of the group or transmitted to several nodes of the group, or by addressing information in the case of a message transmitted in unicast mode), to perform one or more checks relating to their ability to operate in the representative mode, and depending on the results of these checks, to respond with a positive acknowledgment when the results of these checks indicate that they have the ability to operate in the representative mode, or conversely to respond with a negative acknowledgment when the results of these checks indicate that they do not have the ability to operate in the representative mode. For example, a check may comprise measuring the battery level of the communication node, and comparing the measured level with a threshold. If the measured level is below the threshold, indicating that the battery is discharged, the node can be configured to transmit a negative acknowledgment in response to the received request. This scheme advantageously allows ensuring that a node designated to operate in the representative mode is able to do so, for example before carrying out operating mode changes and updating, where appropriate, operating mode status tables kept updated by one or more nodes of the group.

In other embodiments, control of the operation in the representative mode may be configured so that a message requesting an operation in the representative mode comprises, either accompanied by, or, depending on the embodiment, interpreted as comprising a query to ensure that the destination node has the ability to operate in the representative mode. This embodiment advantageously makes it possible to avoid the communication nodes having to send an acknowledgment message in response, in order to limit the use of their battery, when the protocol designating the node operating in the representative mode provides that a non-response from the node receiving the request can be interpreted as a positive acknowledgment of this request.

In particular, when the message requesting operation in the representative mode is received from another node of the group, for example a node operating in the representative mode, possibly intended to exit this mode, said another node of the group may be configured to verify that the node of the group to which it is transmitting the requesting message can enter representative mode. This advantageously makes it possible to avoid carrying out a protocol for designating a successor node to operate in the representative mode, possibly comprising the exchange of several messages, with a node which does not have the ability to enter representative mode, for example because its battery is too drained.

In one or more embodiments, detecting the occurrence of an operating mode change event may be implemented in software form by an interrupt handler (software and/or hardware) configured to execute a program corresponding to each interrupt when it occurs. The interrupt handler may for example be configured to be executed for one or more of the events described above: expiration of a timer, battery level reaching a threshold, link quality level reaching a threshold, and receipt of a message, in particular from a group management unit and/or from another communication node.

In one or more embodiments, when a node is operating in the representative mode, upon detecting the occurrence of an operating mode change event among one or more operating mode change events configured on the node, the designation of at least one other node in the group to operate in the representative mode in place of the node exiting operation in the representative mode may comprise the identification of that other node in the group to succeed the node as a node operating in the representative mode.

In one or more embodiments, whether or not the control of the operation in the representative mode for the group is centralized (for example when it is carried out by a communication node of the group, for example a node operating in the representative mode, or by a central entity, for example a group management unit (when this unit does not correspond to a communication node of the group), implemented for example by a remote management platform), this control can be configured so that the designation of at least one other node in the group to operate in the representative mode in place of the node is made based on a list of nodes in the group defining a sequence of nodes operating in the representative mode. In one embodiment, such a list may define a sequence in which each node is to operate in the representative mode after the immediately preceding node in the sequence. In one embodiment, this sequence may be defined based on the network addresses of each node listed. Depending on the embodiment, the list of nodes of the group may be stored in the memory of a node operating in the representative mode and then transmitted to its successor when exiting representative mode, may be stored in the memory of a group management unit configured to carry out the control of the operation in the representative mode for the group, and/or may be stored in the memory of one or more nodes of the group, or even all the nodes of the group, to ensure redundant storage, regardless of their current operating mode.

In one or more embodiments, the list of nodes of the group defining a sequence of nodes operating in the representative mode may be configured to be reconstructed dynamically from data relating to the nodes of the group, for example such as identifiers and/or addresses of these nodes. In this case, the identification of a node succeeding another node operating in the representative mode can be carried out on the basis of data relating to the nodes of the group, which advantageously makes it possible to avoid storing in memory a list defining the sequence, in particular in the embodiments where at least some of the communication nodes are devices with very low memory storage capacities.

In one or more embodiments, the list of nodes of the group defining a sequence of nodes operating in the representative mode may be dynamically reconfigured to take into account constraints evolving over time that are associated with the listed nodes, for example such as their respective battery levels. According to this example, a node with a lower battery level than the next node in the sequence could be moved in the sequence so that it is not called upon to take the role of representative node until after the node having a higher battery level.

In one or more embodiments, the designation of a successor node by a node currently operating in the representative mode may comprise the transmission of a token from the node currently operating in the representative mode to the node designated to be its successor. In other embodiments, the transmission of a token from one node to another, in order to transmit the role of node operating in the representative mode, may be controlled by a central entity, such as a group management unit (which, depending on the embodiment, may be implemented within a communication node or within a remote management platform).

In one or more embodiments, control of the operation in the representative mode for the group may be configured to circulate this token between the various communication nodes of the group. Advantageously, circulation of the token will be configured so that the token circulates between the various nodes, remaining associated with a node for a limited time, in order to distribute the energy consumption associated with management of the token between the nodes of the group.

In one or more embodiments, control of the operation in the representative mode for the group may be configured so that there is at least one node of the group operating in the representative mode at all times. As discussed above, the control may further be configured so that there is a single node of the group operating in the representative mode at all times.

Figure 4A:
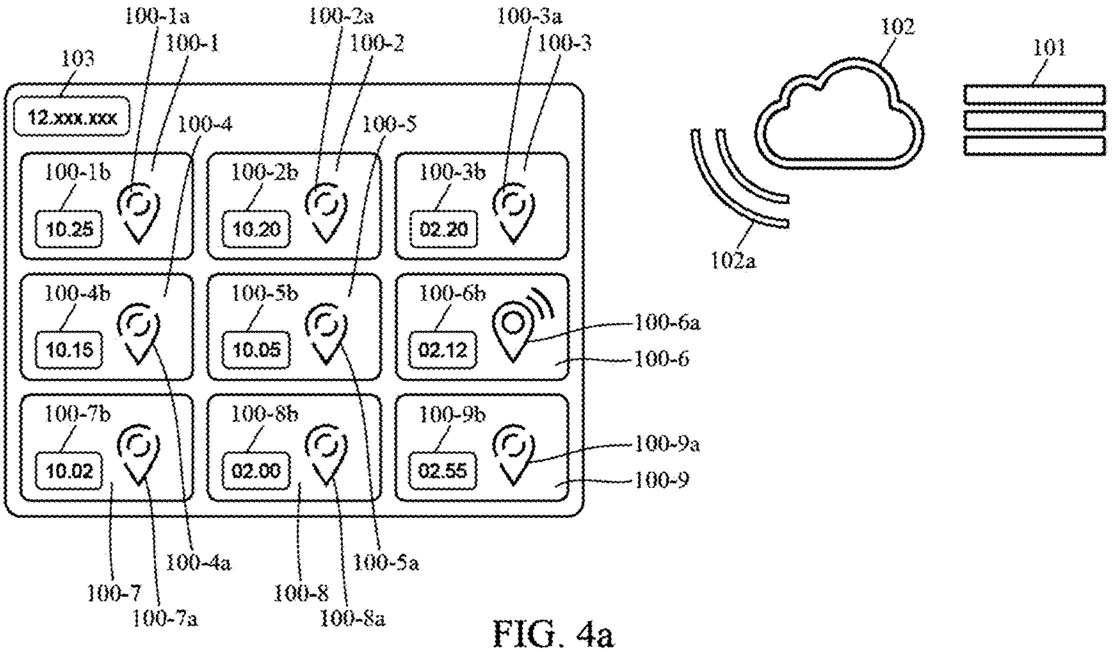
FIG. 4*a* is a diagram illustrating an example of a system for implementing one or more embodiments of the provided method.
Figure 4B:
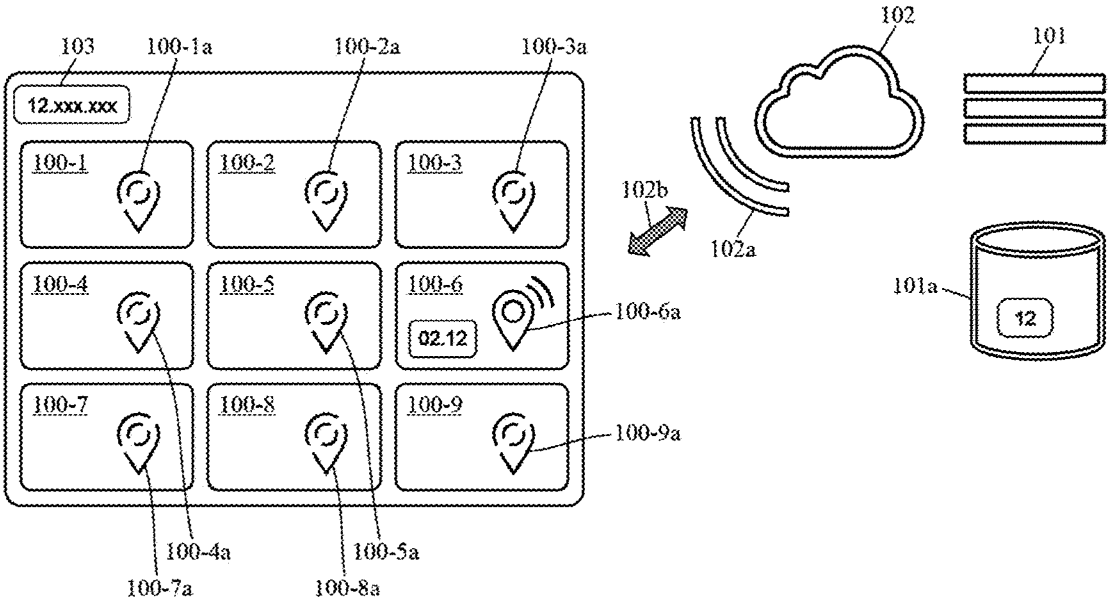
FIG. 4*b* is a diagram illustrating an example of a system for implementing one or more embodiments of the provided method.

FIGS. 4*a* and 4*b* illustrate a group of communication nodes operating according to one or more embodiments of the provided method described below.

With reference to FIG. 4*a*, control of the operation in the representative mode for the group may be configured in one or more embodiments to structure an addressing plan for the nodes of the group by aggregating the respective identifiers (100-1*b*-100-9*b*) of the nodes of the group corresponding to an address (103) defined for the group, for example in IP format.

In the example shown, nine tracking devices (100-1-100-9) are grouped in a lot to which a single IP address is assigned. These nine devices may comprise one or more sensors, sending data to communication nodes configured according to one or more embodiments. In the use case where the trackers are used to monitor food products, they may for example be temperature sensors configured to send an alert to the associated communication node in the event of a break in the cold chain, and geolocation sensors (100-1*a*-100-9*a*) configured to send geolocation data from the device to the associated communication node.

In cases where the devices are located in close proximity to each other, the provided method sends, for example to a remote server (101) as illustrated in the figure, by means of one or more communication networks (102) of which at least one is a network using wireless communication links (102*a*) that is used by the devices (100-1-100-9) to communicate with the remote server (101), alarms relating to the chain cold and/or data relating to the geolocation of the lot of devices, through a single node of the group operating in the representative mode (for example the node included in device 100-6); this is particularly advantageous, in particular as it saves the battery of each device and minimizes the wear of each device by limiting its use to local communications, meaning to the representative node, except during the periods of time when it is operating in the representative mode.

In one or more embodiments, one or more data communication nodes of the group may be configured to generate, when operating in the representative mode, representative node data which comprise inventory data of the nodes of the group.

In one or more embodiments, this inventory data may be generated on the basis of geolocation data received or expected by the node operating in the representative mode, from the other nodes of the group.

For example, in one embodiment, the node operating in the representative mode may be configured to determine an estimate of the distance between its position and that of each node in the group sending their geolocation information to it, and to generate inventory data based on this determination.

For example, if the determined distance for one of the other nodes in the group exceeds a predetermined threshold, the node operating in the representative mode may be configured to generate inventory data indicating that this other node is not or is no longer geolocated with the rest of the group of nodes.

In one embodiment, the node operating in the representative mode may be configured to detect that it has not received geolocation data originating from one of the other nodes in the group, or that it is no longer receiving these data in the case where, for example, the group is configured dynamically, or it has never received them in the case where, for example, the group has been preconfigured. It may further be configured to generate, upon detection that it has not received geolocation data originating from one of the other nodes in the group, inventory data based on this determination.

These embodiments of the provided method advantageously make it possible to facilitate a peer-to-peer inventory in real time while minimizing the use of resources (battery, transmission, throughput, etc.) of the nodes of the group, by generation of the inventory data (and therefore management of an inventory) by the node operating in the representative mode, but also to better manage sending data to a remote platform, where appropriate, for example alerting that a lot is no longer complete or has not been complete for a significant period of time. This last case illustrates, for example, a partial break in the cold chain during transport.

The embodiments illustrated in FIG. 4*a* are particularly suitable for the use case, for example, of a pallet of crates (each equipped with a tracking module, or "tracker", comprising a device operating according to one of the embodiments provided in the present description), which can advantageously be identified as a unit as viewed from the platform, for simplified management. This pallet may contain one or more homogeneous lots (type of objects, expiration date, etc.) that are directly identifiable, while keeping a single crate operating in the representative mode, transmitting information for the entire lot to the remote platform.

With reference to FIG. 4*b*, control of the operation in the representative mode for the group may be managed, in whole or in part, by a remote platform (101) such as the one illustrated in FIG. 1*b*.

In one or more embodiments, this remote platform (101) may be configured to manage each communication node individually or in groups, by means of the structured addressing plan described above with reference to FIG. 4*a*, in order to automatically aggregate a general overview of the group of communication nodes, for example stored in a database (101*a*) coupled to the platform (101).

In one or more embodiments, the platform may further be configured to configure and possibly reconfigure, where appropriate, the communication nodes when communication with the communication node operating in the representative mode (100-6) is bidirectional (102*b*), which is the case for example for communications using a cellular network (2G-5G) or a low-power wireless network, for example a LPWAN network ("Low-power Wide-area-network") such as LoRa™.

Figure 5A:
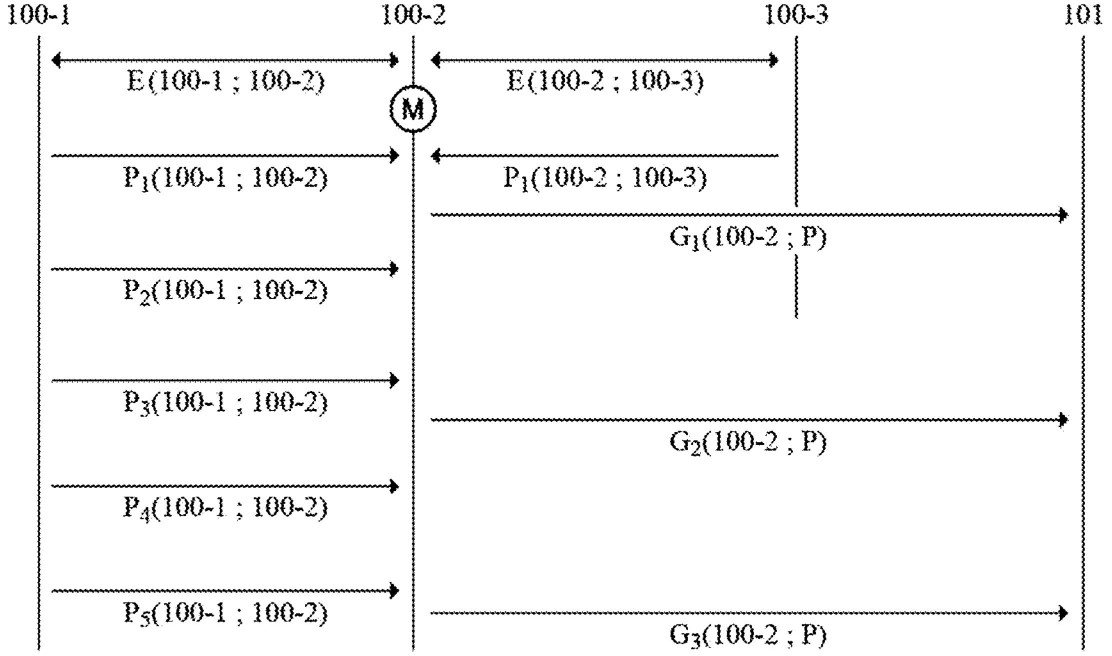
FIG. 5*a* is a diagram illustrating data exchanges between communication nodes and a remote platform, according to one or more embodiments.
Figure 5B:
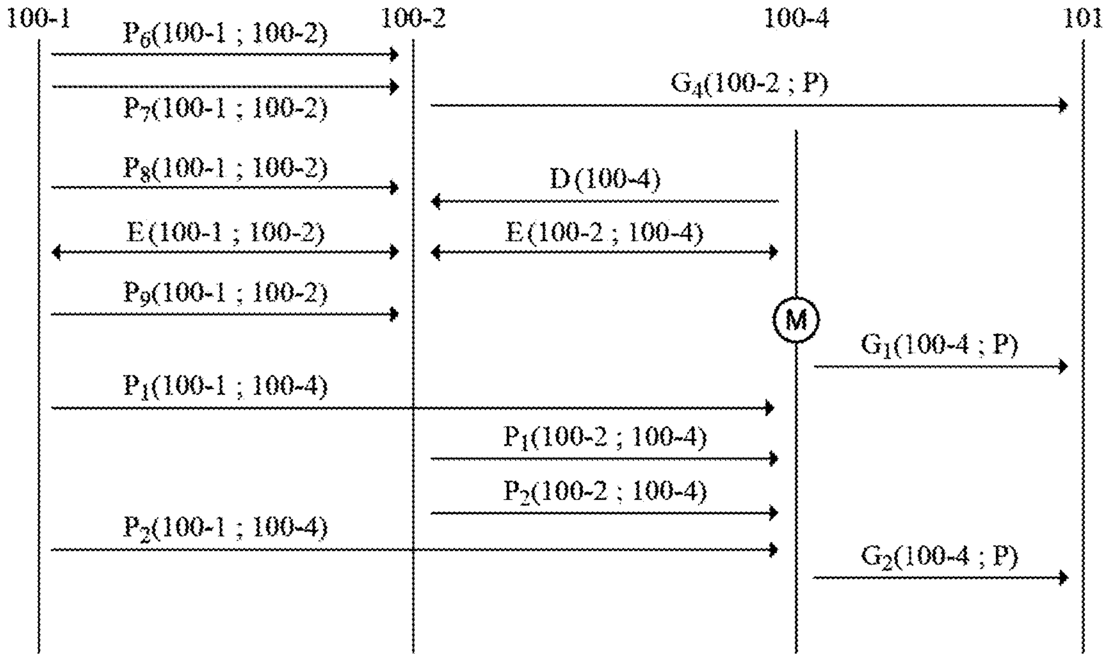
FIG. 5*b* is a diagram illustrating data exchanges between communication nodes and a remote platform, according to one or more embodiments.

FIGS. 5*a* and 5*b* are diagrams illustrating message exchanges between a plurality of communication nodes and a remote platform operating according to one or more embodiments of the provided method, described below.

With reference to FIG. 5*a*, formation of a group of communication nodes is initialized during a phase of mutual listening between the communication nodes (100-1, 100-2, 100-3), during which these nodes exchange discovery messages, for example as defined by the technical specification of the WiFiDirect standard.

Once the group has been formed, the communication nodes of the group designate (M) a node of the group to operate in the representative mode (node 100-2 in the figure), for example using a predefined list or a token as described above for one or more embodiments (exchange of messages E(100-1; 100-2) and E(100-2; 100-3) in the figure) .

The nodes of the group then transmit one or more presence messages (P1(100-1; 100-2) and P1(100-3; 100-2)) to the node currently operating in the representative mode (100-2), which, upon receipt of these one or more presence messages, transmits representative node data comprising geolocation data (message G1(100-2; P)) to the remote platform (101).

The node currently operating in the representative mode (100-2) may be configured to transmit repeatedly to the remote platform (101), regularly or not, representative node data comprising geolocation data updated at each transmission (messages G1(100-2; P), G2(100-2; P) and G3(100-2; P)). As illustrated in FIG. 5*a*, these representative node data comprising geolocation data can be updated and then transmitted to the remote platform (101) repeatedly, and/or, depending on the embodiment, upon receipt of a predetermined number of presence messages from at least one node of the group (P2(100-1; 100-2) and P3(100-1; 100-2) for G2(100-2; P), and P4(100-1; 100-2) and P5(100-1; 100-2) for G3(100-2; P)), and/or upon expiration of a timer triggered by a predetermined value or a value dynamically determined at each transmission of representative node data.

FIG. 5*a* further illustrates a case in which one of the nodes (100-3) initially comprised in the group of nodes withdraws from the group, and stops sending presence messages to the node currently operating in the representative mode (100-2). In this case, the updating of the geolocation data comprised in the representative node data transmitted to the remote platform (101) may, in one or more embodiments, take into account the withdrawal of the node (100-3) in order to inform the remote platform, which can thus have geolocation information for the group and group inventory information associated with geolocation information for the group.

FIG. 5*b* illustrates the reverse case, in which a new communication node (100-4) joins the existing group (100-1 and 100-2).

As described with reference to FIG. 5*a*, representative node data comprising geolocation data may be updated and then transmitted to the remote platform (101) repeatedly, and/or, depending on the embodiment, upon receipt of a predetermined number of presence messages from at least one node of the group (P6(100-1; 100-2) and P7(100-1; 100-2) for G4 (100-2; P)), and/or upon expiration of a timer triggered by a predetermined value or a value dynamically determined at each transmission of representative node data.

The node (100-4) wishing to join the group sends a discovery message (D(100-4)) which is taken into account by the node currently operating in the representative mode (100-2).

Once the group has been updated with the arrival of the new node (100-4), the communication nodes of the group designate (M) a node of the group to operate in the representative mode (node 100-4 in the figure), other than the previously designated node (100-2), for example using a predefined list or a token as described above for one or more embodiments (message exchanges E(100-1; 100-2) and E(100-2; 100-4) in the figure). This updating of the node of the group designated to operate in the representative mode advantageously makes it possible to avoid using the resources of only one node to implement the representative node functions of the group.

In one or more embodiments, the provided method may provide a scheme for the transfer ("handover") of the node function operating in the representative mode, to ensure a lossless transfer of data from a first node (100-2) to a second node (100-4). In the exemplary embodiment illustrated in FIG. 5*b*, the node (100-2) previously operating in the representative mode transmits, before exiting representative mode, to the node currently operating in the representative mode (100-4), data received (as the node in the representative mode) from other nodes (messages P8(100-1; 100-2) and P9(100-1; 100 2)) and/or the representative node data generated but not yet transmitted to the remote platform (101), so that said node generates its own representative node data and transmits them to the remote platform (101) (message G1(100-4; P)).

The nodes of the group then transmit one or more presence messages (P1(100-1; 100-4) and P2(100-1; 100-4), and P1(100-2; 100-4) and P2(100-2; 100-4)) to the node currently operating in the representative mode (100-4), which upon receipt of these one or more presence messages, transmits representative node data comprising geolocation data (message G2(100-4; P)) to the remote platform (101).

The provided method advantageously makes it possible to minimize energy consumption and to save network bandwidth for any type of application for tracking objects, animals, or people, as well as their containers or vehicles, especially when they are traveling or are simply grouped together, depending on the embodiment implemented.

This is a genuine implementation of local collective intelligence. This allows operators and logisticians to extend the charge and life of portable devices that track objects or people. This solution also allows telecommunications operators to decongest their networks, in terms of bandwidth as well as addressing.

INDUSTRIAL APPLICATION

Depending on the embodiment chosen, certain acts, actions, events, or functions of each of the methods described in this document may be carried out or occur in a different order than that in which they were described, or may be added, merged, or indeed may not be carried out or occur, as the case may be. Furthermore, in some embodiments, certain acts, actions, or events are carried out or occur concurrently and not sequentially.

Although described through a number of detailed exemplary embodiments, the provided control method and the device for implementing an embodiment of the method comprise various variants, modifications, and improvements which will be apparent to those skilled in the art, it being understood that these various variants, modifications, and improvements are within the scope of the present subject disclosure as defined by the claims which follow. In addition, various aspects and features described above may be implemented together, or separately, or may be substituted for one another, and all of the various combinations and sub-combinations of the aspects and features are within the scope of present subject disclosure. In addition, some systems and devices described above may not incorporate all of the modules and functions described for the preferred embodiments.

The invention claimed is:

1. A method of managing a data communication node in a group comprising at least the node, the method comprising:
   - selecting, by the node, an operating mode among a plurality of operating modes configured on the node and comprising a representative mode; and
   - when the node is operating in the representative mode, generating, by the node, representative node data and transmitting the representative node data to a group management unit,
   - wherein the group comprises a second node, and the representative node data at least relate to the second node, and
   - when the node is operating in the representative mode, upon detecting the occurrence of a representative change event, determining by the node, to switch to an operation mode different from the representative mode, and identifying, by the node, another node of the group to succeed the node as a node operating in the representative mode,
   - the method further comprising identifying the other node according to a list of nodes of the group defining a sequence of nodes operating in the representative mode.

2. The method of claim 1, wherein a remote management platform comprises the group management unit, and wherein transmitting the representative node data to the group management unit comprises: transmitting the representative node data to the management platform via a second wireless communication network.

3. The method of claim 1, further comprising, when the node is operating in the representative mode and when the group comprises a second node, receiving data originating from the second node via a first wireless communication network formed by the nodes of the group, and generating the representative node data based on the received data.

4. The method of claim 1, further comprising: activating an operation in the representative mode upon receipt of a request to operate in the representative mode.

5. The method of claim 1, wherein the plurality of operating modes configured on the node further comprises a represented mode, the method further comprising: activating an operation in the represented mode upon receipt of a message identifying another node of the group operating in the representative mode.

6. The method of claim 1, wherein the plurality of operating modes configured on the node further comprises a represented mode, the method further comprising, when the node is operating in the represented mode, generating represented node data, identifying another node of the group which is operating in the representative mode, and transmitting the represented node data to the identified node for transmission to the group management unit.

7. The method of claim 1, wherein identifying the other node in the group to succeed the node as a node operating in the representative mode comprises: transmitting to at least one other node in the group a request to change the representative node.

8. The method of claim 7, wherein detecting the occurrence of the representative change event comprises: receiving a message originating from the group management unit.

9. The method of claim 7, wherein the representative change event comprises one among a group comprising: an expiration of a representative mode duration monitoring timer, a battery level relative to a predetermined battery level threshold, and a link quality level relative to a predetermined link quality threshold.

10. The method of claim 1, wherein identifying the other node of the group comprises: verifying that the other identified node can enter representative mode.

11. A device for managing a data communication node in a group comprising at least the node, the device comprising;
   - a processor;
   - a radio-frequency unit operatively coupled to the processor;
   - wherein the device performs, at the node:
     - selecting, by the device, an operating mode among a plurality of operating modes configured on the node and comprising a representative mode; and when the node is operating in the representative mode, generating, by the device, representative node data and transmitting the representative node data to a group management unit, wherein the group comprises a second node, and the representative node data at least relate to the second node, and, when the node is operating in the representative mode, upon detecting the occurrence of a representative change event, determining by the node, to switch to an operation mode different from the representative mode, and identifying, by the device, another node of the group to succeed the node as a node operating in the representative mode, the method further comprising identifying the other node according to a list of nodes of the group defining a sequence of nodes operating in the representative mode.

12. The device of claim 11, wherein a remote management platform comprises the group management unit, and wherein transmitting the representative node data to the group management unit comprises: transmitting the representative node data to the management platform via a second wireless communication network.

13. The device of claim 11, further comprising, when the node is operating in the representative mode and when the group comprises a second node, receiving data originating from the second node via a first wireless communication network formed by the nodes of the group, and generating the representative node data based on the received data.

14. The device of claim 11, further comprising: activating an operation in the representative mode upon receipt of a request to operate in the representative mode.

15. The device of claim 11, wherein the plurality of operating modes configured on the node further comprises a represented mode, and further comprising: activating an operation in the represented mode upon receipt of a message identifying another node of the group operating in the representative mode.

16. A non-transitory computer-readable storage medium for storing a program able to be executed by a computer, comprising a dataset representing one or more programs, the one or more programs comprising instructions for, when the one or more programs are executed by a computer comprising a processing unit operationally coupled to memory means and to an input/output interface module, causing the computer to perform a method for managing a data communication node in a group comprising at least the node, the method comprising:

selecting, by the node, an operating mode among a plurality of operating modes configured on the node and comprising a representative mode; and when the node is operating in the representative mode, generating, by the node, representative node data and transmitting the representative node data to a group management unit, wherein the group comprises a second node, and the representative node data at least relate to the second node, and when the node is operating in the representative mode, upon detecting the occurrence of a representative change event, determining by the node, to switch to an operation mode different from the representative mode, and identifying, by the node, another node of the group to succeed the node as a node operating in the representative mode, the method further comprising identifying the other node according to a list of nodes of the group defining a sequence of nodes operating in the representative mode.

17. The non-transitory computer-readable storage medium of claim 16, wherein a remote management platform comprises the group management unit, and wherein transmitting the representative node data to the group management unit comprises: transmitting the representative node data to the management platform via a second wireless communication network.

18. The non-transitory computer-readable storage medium of claim 16, wherein the method further comprises, when the node is operating in the representative mode and when the group comprises a second node, receiving data originating from the second node via a first wireless communication network formed by the nodes of the group, and generating the representative node data based on the received data.

19. The non-transitory computer-readable storage medium of claim 16, wherein the method further comprises: activating an operation in the representative mode upon receipt of a request to operate in the representative mode.

* * * * *